United States Patent
Singh et al.

(10) Patent No.: US 12,006,858 B2
(45) Date of Patent: Jun. 11, 2024

(54) ELECTRONIC PUMP/COMPRESSOR FOR AN ENGINE SYSTEM

(71) Applicant: Cummins Power Generation IP, Inc., Minneapolis, MN (US)

(72) Inventors: Trideep Singh, Bhilai (IN); Jingxuan Liu, Columbus, IN (US); Veronica Susan Perks, Greenwood, IN (US); Phillip L. Roach, Columbus, IN (US); Carlos Alcides Lana, Columbus, IN (US); John C. Stetter, Columbus, IN (US); Stephen Cox, Indianapolis, IN (US); Philipe F. Saad, Columbus, IN (US); Rick Vaughn Lewis, Jr., Franklin, IN (US); Milan Khushal Visaria, Pune (IN)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days.

(21) Appl. No.: 17/782,561

(22) PCT Filed: Dec. 2, 2020

(86) PCT No.: PCT/US2020/070840
§ 371 (c)(1),
(2) Date: Jun. 3, 2022

(87) PCT Pub. No.: WO2021/113863
PCT Pub. Date: Jun. 10, 2021

(65) Prior Publication Data
US 2023/0010956 A1      Jan. 12, 2023

(30) Foreign Application Priority Data
Dec. 4, 2019   (IN) .............................. 201941049843

(51) Int. Cl.
F02B 37/16    (2006.01)
F02B 37/04    (2006.01)
(Continued)

(52) U.S. Cl.
CPC ............ F02B 37/168 (2013.01); F02B 37/04 (2013.01); F02B 39/10 (2013.01);
(Continued)

(58) Field of Classification Search
CPC ........ F02B 39/10; F02B 37/16; F02B 37/168; F02B 37/04; F02M 35/10157; F02M 35/10216; F02M 35/10255; F02M 35/104
See application file for complete search history.

(56) References Cited

U.S. PATENT DOCUMENTS 4,182,294 A * 1/1980 Emmenthal ............ F02M 71/02
                                                        123/445
6,363,721 B1 * 4/2002 Prenninger ............. F02B 39/10
                                                         60/599
(Continued)

FOREIGN PATENT DOCUMENTS

DE    10025640 A1    12/2000
DE    10256966 A1    8/2003
(Continued)

OTHER PUBLICATIONS

International Search Report and Written Opinion in PCT/US2020/070840 dated Apr. 6, 2021.

*Primary Examiner* — Gonzalo Laguarda
(74) *Attorney, Agent, or Firm* — Foley & Lardner LLP

(57) ABSTRACT

Systems and apparatuses include a system including an electronic compressor, a bypass intake coupled between an engine system of a generator set and the electronic compressor, a bypass outlet coupled between the electronic compressor and the engine system, and a valve positioned to
(Continued)

selectively inhibit flow between the bypass intake and the bypass outlet during a starting operation.

19 Claims, 15 Drawing Sheets

(51) Int. Cl.
    *F02B 39/10*     (2006.01)
    *F02M 35/10*     (2006.01)
    *F02M 35/104*     (2006.01)

(52) U.S. Cl.
    CPC ............. *F02M 35/10157* (2013.01); *F02M 35/10216* (2013.01); *F02M 35/10255* (2013.01); *F02M 35/104* (2013.01)

(56) References Cited

U.S. PATENT DOCUMENTS

| | | |
|---|---|---|
| 6,408,625 B1 | 6/2002 | Woon et al. |
| 8,751,139 B2 | 6/2014 | Barr et al. |
| 10,480,439 B2 * | 11/2019 | Dudar .................. F02D 41/064 |
| 11,428,155 B2 * | 8/2022 | Lana ...................... F02B 37/04 |
| 11,498,101 B1 * | 11/2022 | Dudar ...................... B67D 7/06 |
| 11,691,905 B2 * | 7/2023 | Dombrock ............. F04B 39/16 |
| | | 261/77 |
| 2003/0106539 A1 | 6/2003 | Jung et al. |
| 2017/0130658 A1 * | 5/2017 | Makkapati .......... F02D 41/0007 |
| 2018/0030905 A1 | 2/2018 | Cress |
| 2018/0252176 A1 | 9/2018 | Oguguo et al. |
| 2018/0262139 A1 | 9/2018 | Oguguo et al. |
| 2018/0334954 A1 | 11/2018 | Banker et al. |
| 2019/0003379 A1 * | 1/2019 | Kemmerling ........... F02B 37/04 |
| 2019/0063347 A1 | 2/2019 | Xiao et al. |
| 2022/0316385 A1 * | 10/2022 | Lewis, Jr. ............ F02B 33/446 |
| 2023/0010956 A1 * | 1/2023 | Singh ................ F02M 35/10216 |

FOREIGN PATENT DOCUMENTS

| | | |
|---|---|---|
| DE | 10 2017 200 800 A1 | 7/2018 |
| DE | 2017207878 A1 | 11/2018 |
| GB | 2490943 B | 9/2016 |
| JP | 2013-124558 A | 6/2013 |

\* cited by examiner

=== PAGE 1 ===

ELECTRONIC PUMP/COMPRESSOR FOR AN ENGINE SYSTEM

CROSS REFERENCE TO RELATED APPLICATIONS

This application is a U.S. national stage entry of PCT/US2020/070840 filed Dec. 2, 2020, which claims priority to and the benefit of Indian Patent Application No. 201941049843 filed on Dec. 4, 2019, the entire contents of which are incorporated herein by reference.

TECHNICAL FIELD

The present disclosure relates to generator sets. More particularly, the present disclosure relates to systems and methods for emergency power supply systems and systems for starting generator sets.

BACKGROUND

Generator sets generally include a prime mover and an alternator driven by the prime mover to produce electrical energy. When a generator set is started, a starter motor cranks the prime mover and a fuel/air mixture is provided to one or more combustion cylinders. Once the prime mover is operating, the prime mover speed is ramped to an operating speed. The alternator can then be synchronized, and a circuit breaker can be closed to connect the electrical energy output of the alternator to a load. The load is then coupled to the electrical energy output using a ramp function until the electrical energy output has reached 100% and the load is fully engaged with the electrical energy output. Generator sets often include additional components including aftertreatment systems, transmissions, silencer systems, etc.

SUMMARY

One embodiment relates to a system that includes an electronic compressor, a bypass intake coupled between an engine system of a generator set and the electronic compressor, a bypass outlet coupled between the electronic compressor and the engine system, and a valve positioned to selectively inhibit flow between the bypass intake and the bypass outlet during a starting operation.

Another embodiment relates to a method that includes opening a bypass valve providing communication between an engine system of a generator set and an electronic compressor, starting the electronic compressor to provide a suction at a bypass intake, purging fresh air from the engine system with the started electronic compressor, cranking a starter motor after starting the electronic compressor, stopping the electronic compressor after the fresh air has been partially or completely purged, and closing the bypass valve after stopping the electronic compressor.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following below are more detailed descriptions of various concepts related to, and implementations of, methods, apparatuses, and systems for integrating an electronically powered compressor into an engine system. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to systems, apparatuses, and methods for utilizing an electric compressor to improve the starting conditions of an engine. More particularly, the disclosure is related to systems and methods for improving the startup of an engine used in a generator set. The electric compressor can be used as an E-pump to pull or suck the air from one end of an intake manifold to purge the fresh air out of the intake manifold and piping. The E-pump fluid path bypasses the engine for an initial time period (e.g., a few seconds) as the engine is cranking at a low speed and is a restriction to air flow during cranking. Once fuel has reached the engine's cylinders and the engine speed starts to increase the electronic compressor can either be isolated and shut down or can be operated as an E-compressor assisting turbochargers within the engine system.

Figure 1:
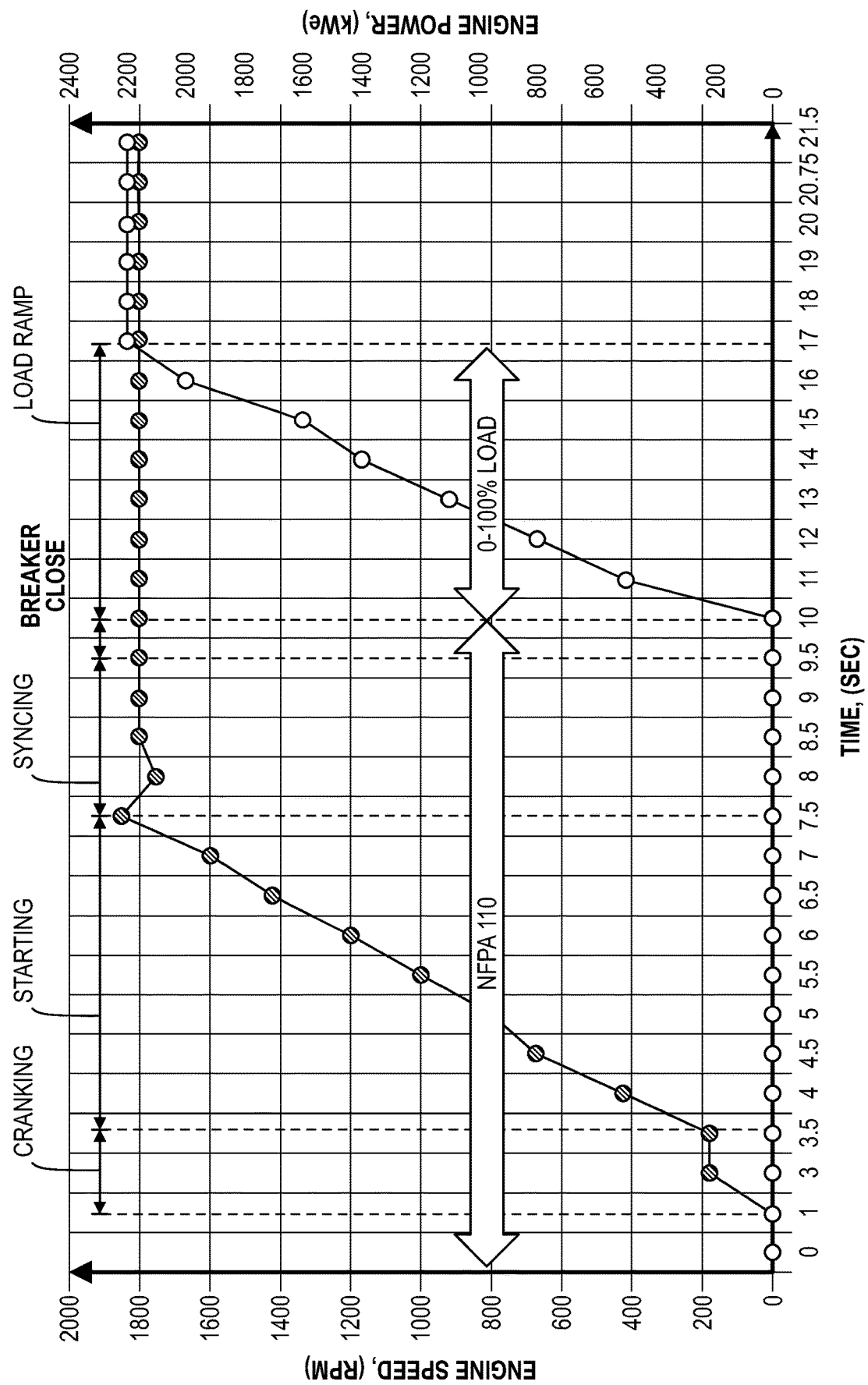
FIG. 1 is a graph showing engine speed and engine power over time.
Figure 2:
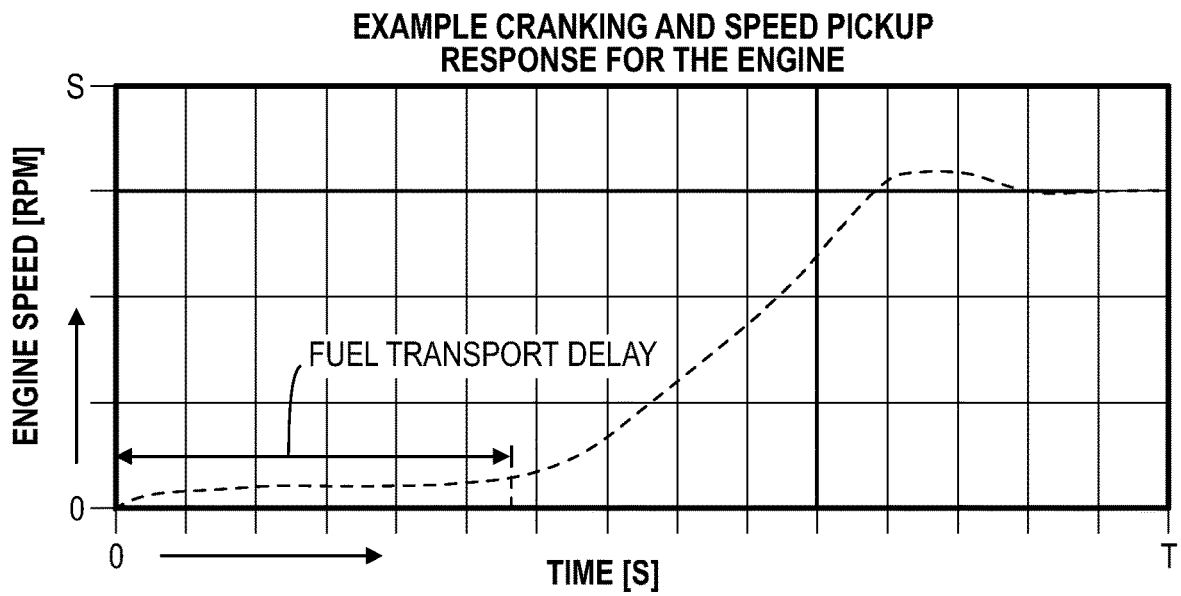
FIG. 2 is a graph showing engine speed over time.

As shown in FIG. 1, it is desirable in generator set systems (e.g., emergency power supply systems) to provide a fast start and synchronization time with the grid of between seven and ten seconds (7-10 sec) for example. Quick starting and synchronization can be a difficult task (e.g., for larger generator sets). Some generator sets include a starter motor (e.g., a 24V starter motor or a 64V starter motor) that drives the engine at a cranking speed. In some embodiments, the cranking speed is 180 rpm. Generator sets including piping and other fluid flow paths that must be purged during startup before an air/fuel mixture can reach the cylinders and combustion can begin. The time it takes the generator set to purge the fresh air can be called a fuel transport delay time. As shown in FIG. 2, in some engines a cranking speed of 180 rpm can lead to a fuel transport delay time of five seconds (5 sec) or more.

In order to decrease the fuel transport delay time, embodiments of this disclosure aim to increase the mass flow rate of a charge flowing through the engine. In other words, increase the flow rate of the fresh air out of the system, and the air/fuel mixture into the system. Due to the increased mass flow rate the charge (air/fuel mixture), the air/fuel mixture will take less time to reach the cylinders. The reduced fuel transport delay time allows combustion to start earlier and reduce the overall speed pickup (e.g., an inertia of the engine and turbochargers) time.

Figure 3:
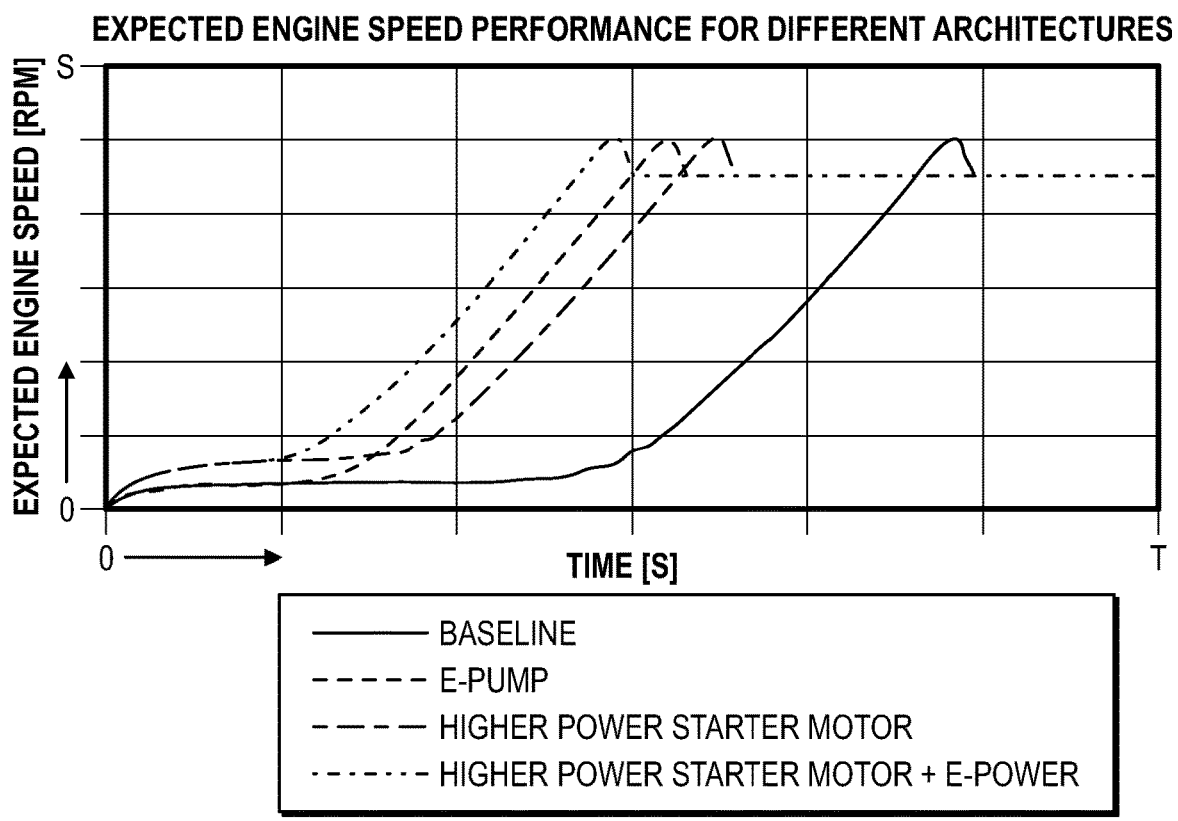
FIG. 3 is a graph showing expected engine speed over time of four different engine arrangements.

As shown in FIG. 3, use of a higher power starter motor and use of the compressor as an E-pump are considered. The E-pump provides a meaningful decrease in the fuel transport delay time when compared to an engine system operating without the E-pump feature.

Figure 4:
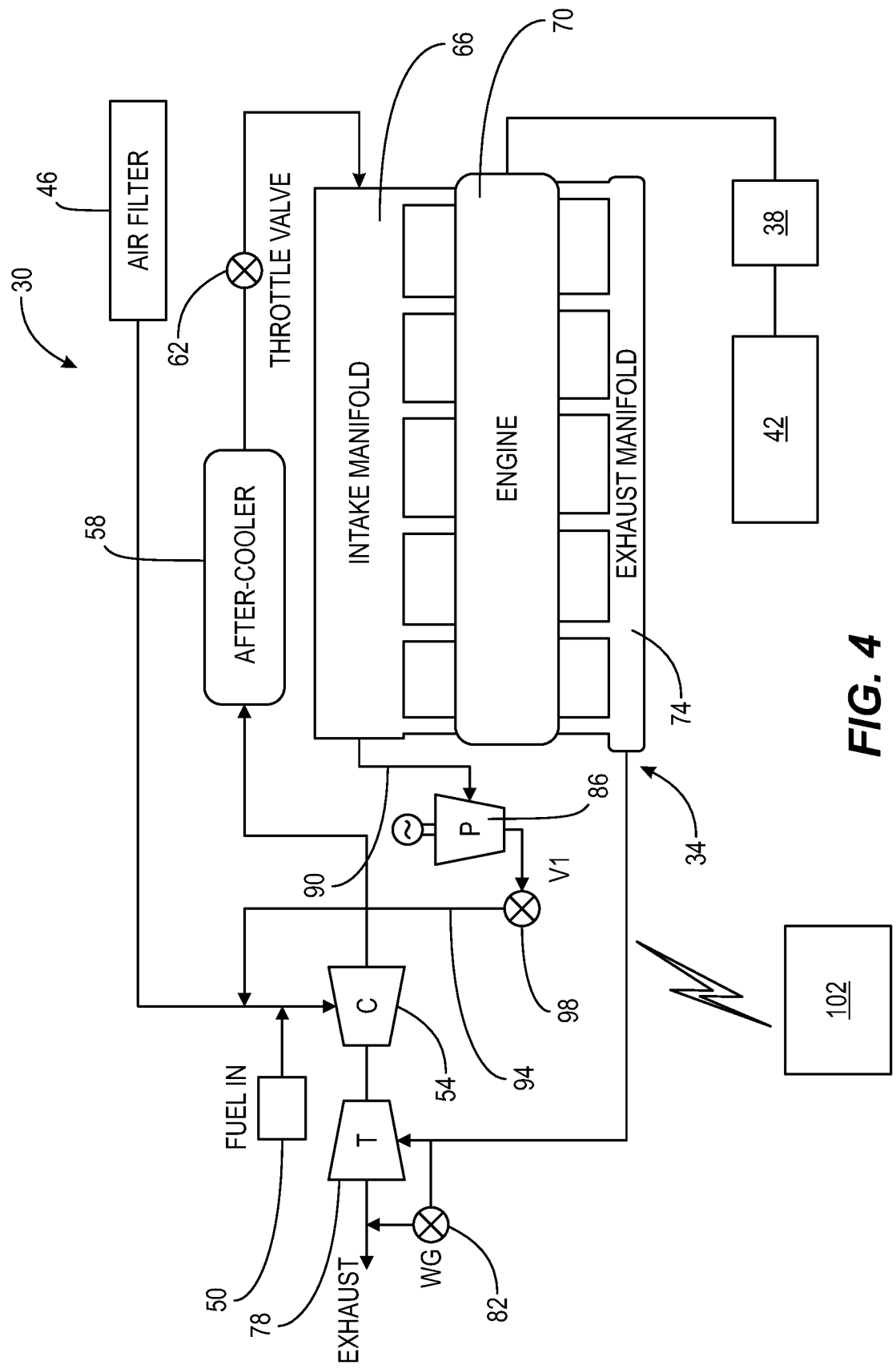
FIG. 4 is a schematic diagram of a generator set according to some embodiments.

As shown in FIG. 4, a generator set 30 includes an engine 34 coupled to a transmission or gearbox 38 to drive an alternator 42 for the production of electrical energy. In some embodiments, the gearbox 38 is eliminated. In some embodiments, the generator set 30 includes additional components (e.g., an aftertreatment system, a silencing system, a cooling system, etc.). Generally, the engine 34 burns a combustible fuel (e.g., diesel, natural gas, etc.) to produce mechanical energy and turn an input of the alternator 42. The alternator converts the mechanical energy into electrical energy for use in an electrical grid or subsystem.

The engine 34 includes an air handling system 46 structured to receive, filter, and control the flow of fresh intake air from the atmosphere. A fuel handling system 50 is structured to selectively inject fuel into the fresh intake air to provide an air/fuel mixture. A compressor 54 receives the air/fuel mixture and compresses the mixture to provide a boost charge. An after-cooler 58 receives the air/fuel mixture from the compressor 54 and lowers the temperature of the air/fuel mixture. A throttle valve 62 is positioned downstream of the after-cooler 58 and controls a flow of the air/fuel mixture to an intake manifold 66 on the engine 34. The intake manifold 66 distributes the air/fuel mixture to a bank of engine cylinders 70. The fuel handling system 50 also include fuel injectors in selective fluid communication with the engine cylinders 70 to inject fuel. After combustion within the engine cylinders 70, exhaust gas is received in the exhaust manifold 74 and provided to a turbine 78 which in turn provides power to the compressor 54. A wastegate valve 82 is positioned to bypass the turbine 78 and is structured and controlled to manage the boost charge pressure provided by the compressor 54. In some embodiments, the fuel handling system 50 injects fuel into the intake manifold, a swirl chamber, or similar. In some embodiments, the fuel handling system provides direct injection (i.e., injection directly into the cylinders).

The engine 34 further includes a bypass system including an electronic compressor 86 that can function as an E-pump to create suction or an E-compressor to create pressure as will be described further in the description that follows. In some embodiments, the electronic compressor 86 may function as both an E-pump and E-compressor.

In the embodiments shown in FIG. 4, the electronic compressor 86 is coupled to the intake manifold 66 via a bypass intake 90. The electronic compressor 86 is structured to be electrically driven (e.g., by an electric motor) to provide a suction in the intake manifold 66. A bypass outlet 94 is coupled between the electronic compressor 86 and the air handling system 46. In some embodiments, the bypass outlet 94 communicates with the air handling system 46 upstream of any fuel injection from the fuel handling system 50. A bypass valve 98 is positioned in the bypass outlet 94 and is controlled to selectively allow or inhibit flow through the bypass outlet 94.

A controller 102 in structured to communicate with the air handling system 46, the fuel handling system 50, the throttle valve 62, the wastegate valve 82, the electronic compressor 86, and the bypass valve 98. The controller 102 is also structured to receive sensor inputs from various sensor arrays associated with the generator set 30 and can be structured to control operation of other aspects of the engine 34.

As the components of FIG. 4 are shown to be embodied in the generator set 30, the controller 102 may be structured as one or more electronic control units (ECU). The controller 102 may be separate from or included with at least one of a transmission control unit, an exhaust aftertreatment control unit, a powertrain control module, an engine control module, a genset control module, etc. The function and structure of the controller 102 is described in greater detail in FIG. 5.

Figure 5:
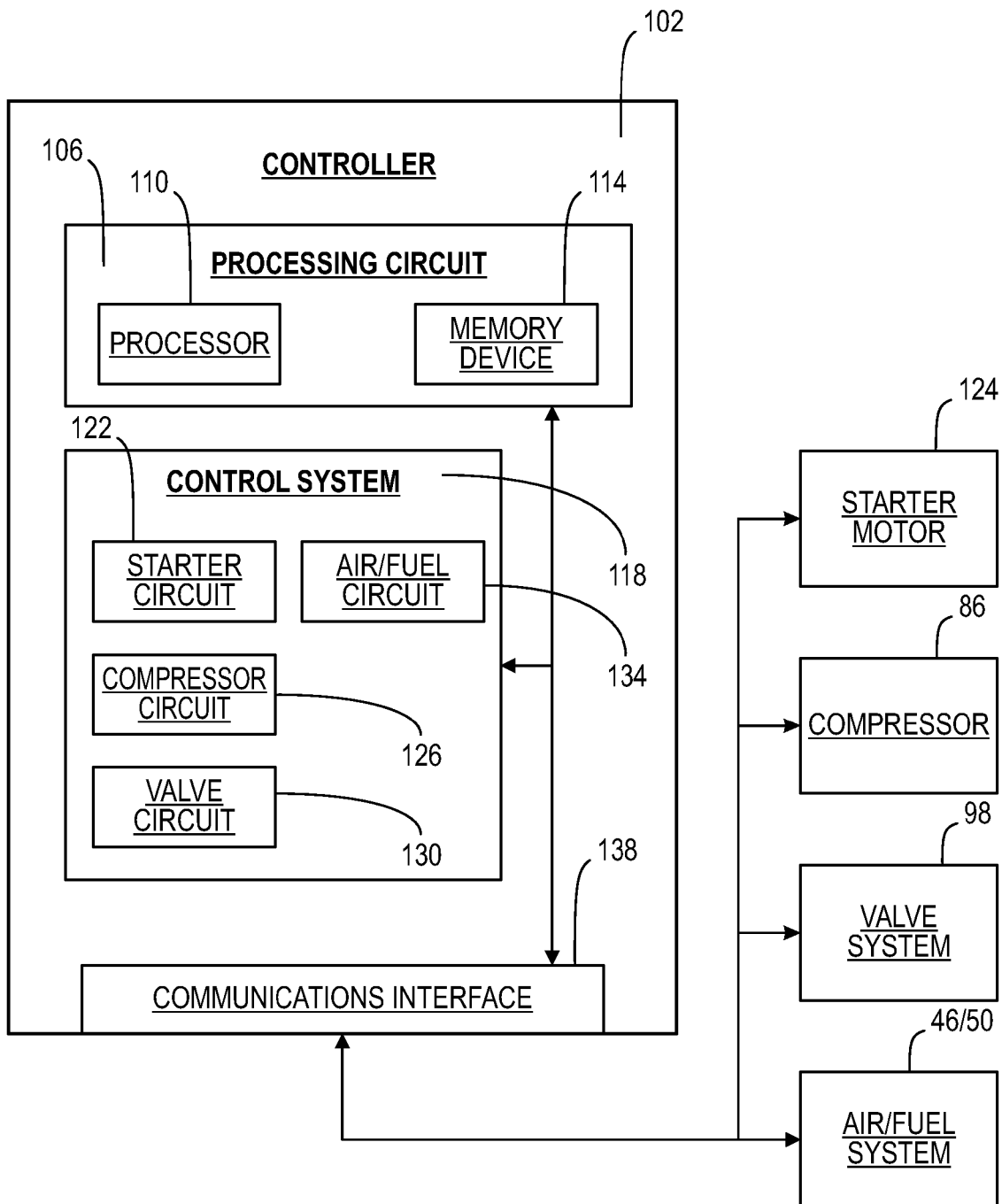
FIG. 5 is a schematic diagram of a controller of the generator set of FIG. 4 according to some embodiments.

Referring now to FIG. 5, a schematic diagram of the controller 102 of the generator set 30 of FIG. 4 is shown according to an example embodiment. As shown in FIG. 5, the controller 102 includes a processing circuit 106 having a processor 110 and a memory device 114, a control system 118 having a starter circuit 122 structured to control operation of a starter motor 124 of the engine 34, a compressor circuit 126 structured to control operation of the electronic compressor 86, a valve circuit 130 structured to control operation of any bypass valves (e.g., the bypass valve 98), an air/fuel circuit 134 structured to control operation of the air handling system 46 and the fuel handling system 50, and a communications interface 138. Generally, the controller 102 is structured to control operation of the engine 34 during a starting operation. The electronic compressor 86 is used as an E-pump to purge fresh air from the intake manifold 66 to increase the speed at which the fuel can gain access to the cylinders 70 and the engine 34 can start.

In one configuration, the starter circuit 122, the compressor circuit 126, the valve circuit 130, and the air/fuel circuit 134 are embodied as machine or computer-readable media that is executable by a processor, such as processor 110. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the starter circuit 122, the compressor circuit 126, the valve circuit 130, and the air/fuel circuit 134 are embodied as hardware units, such as electronic control units. As such, the starter circuit 122, the compressor circuit 126, the valve circuit 130, and the air/fuel circuit 134 may be embodied as one or more circuitry components including, but not limited to, processing circuitry, network interfaces, peripheral devices, input devices, output devices, sensors, etc. In some embodiments, the starter circuit 122, the compressor circuit 126, the valve circuit 130, and the air/fuel circuit 134 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the starter circuit 122, the compressor circuit 126, the valve circuit 130, and the air/fuel circuit 134 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The starter circuit 122, the compressor circuit 126, the valve circuit 130, and the air/fuel circuit 134 may also include programmable hardware devices such as field programmable gate arrays, programmable array logic, programmable logic devices or the like. The starter circuit 122, the compressor circuit 126, the valve circuit 130, and the air/fuel circuit 134 may include one or more memory devices for storing instructions that are executable by the processor(s) of the starter circuit 122, the compressor circuit 126, the valve circuit 130, and the air/fuel circuit 134. The one or more memory devices and processor(s) may have the same definition as provided below with respect to the memory device 114 and processor 110. In some hardware unit configurations, the starter circuit 122, the compressor circuit 126, the valve circuit 130, and the air/fuel circuit 134 may be geographically dispersed throughout separate locations in the generator set 30. Alternatively, and as shown, the starter circuit 122, the compressor circuit 126, the valve circuit 130, and the air/fuel circuit 134 may be embodied in or within a single unit/housing, which is shown as the controller 102.

In the example shown, the controller 102 includes the processing circuit 106 having the processor 110 and the memory device 114. The processing circuit 106 may be structured or configured to execute or implement the instructions, commands, and/or control processes described herein with respect to starter circuit 122, the compressor circuit 126, the valve circuit 130, and the air/fuel circuit 134. The depicted configuration represents the starter circuit 122, the compressor circuit 126, the valve circuit 130, and the air/fuel circuit 134 as machine or computer-readable media. However, as mentioned above, this illustration is not meant to be limiting as the present disclosure contemplates other embodiments where the starter circuit 122, the compressor circuit 126, the valve circuit 130, and the air/fuel circuit 134, or at least one circuit of the starter circuit 122, the compressor circuit 126, the valve circuit 130, and the air/fuel circuit 134, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 110) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., starter circuit 122, the compressor circuit 126, the valve circuit 130, and the air/fuel circuit 134 may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 114 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 114 may be communicably connected to the processor 110 to provide computer code or instructions to the processor 110 for executing at least some of the processes described herein. Moreover, the memory device 114 may be or include tangible, non-transient volatile memory or non-volatile memory. Accordingly, the memory device 114 may include database components, object code components, script components, or any other type of information structure for supporting the various activities and information structures described herein.

The starter circuit 122 is structured to receive a cranking input (e.g., a start command from a user interface) and activate the starter motor 124 so that the engine cylinders 70 are operated at a cranking speed to initiate operation of the engine 34. In some embodiments, the starter circuit 122 controls the starter motor 124 according to a cranking profile that includes a step function, a ramp function, or a timed function that operates the starter motor 124 for a predetermined cranking time and/or begins operation of the starter motor 124 after a cranking start time.

The compressor circuit 126 is structured to control operation of the electronic compressor 86 as either an E-pump or an E-compressor. The compressor circuit 126 communicates with an electric motor that turns the compressor wheel of the electronic compressor 86. In some embodiments, the compressor circuit 126 operates the electronic compressor 86 according to a compressor profile (e.g., a step function, a ramped function, a timed function, etc.) to provide the desired system operation. In some embodiments, the compressor profile includes a predetermined E-pump operation time, and/or a compressor start time.

The valve circuit 130 is structured to control operation of the bypass valve 98 (or any other valves associated with the electronic compressor 86) to selectively allow or inhibit flow to or from the electronic compressor 86. In some embodiments, the valve circuit 130 operates the bypass valve 98 according to a valve profile (e.g., a step function, a ramped function, a timed function, etc.) to provide the desired system operation. In some embodiments, the valve profile includes a predetermined valve open time and/or a valve open start time.

The air/fuel circuit 134 is structured to control operation of the air handling system 46 and the fuel handling system 50. In some embodiments, the air/fuel circuit 134 operates the air handling system 46 and the fuel handling system 50 according to an air/fuel profile in conjunction with other controllers or control units to provide a fast-starting engine 34 and desired engine operation after starting.

The controller 102 is to operate the bypass system. In some embodiments, as will be discussed in further detail below, the bypass system can be arranged in alternate configurations. The controller 102 is structured to operate the bypass system in all configurations.

Figure 6:
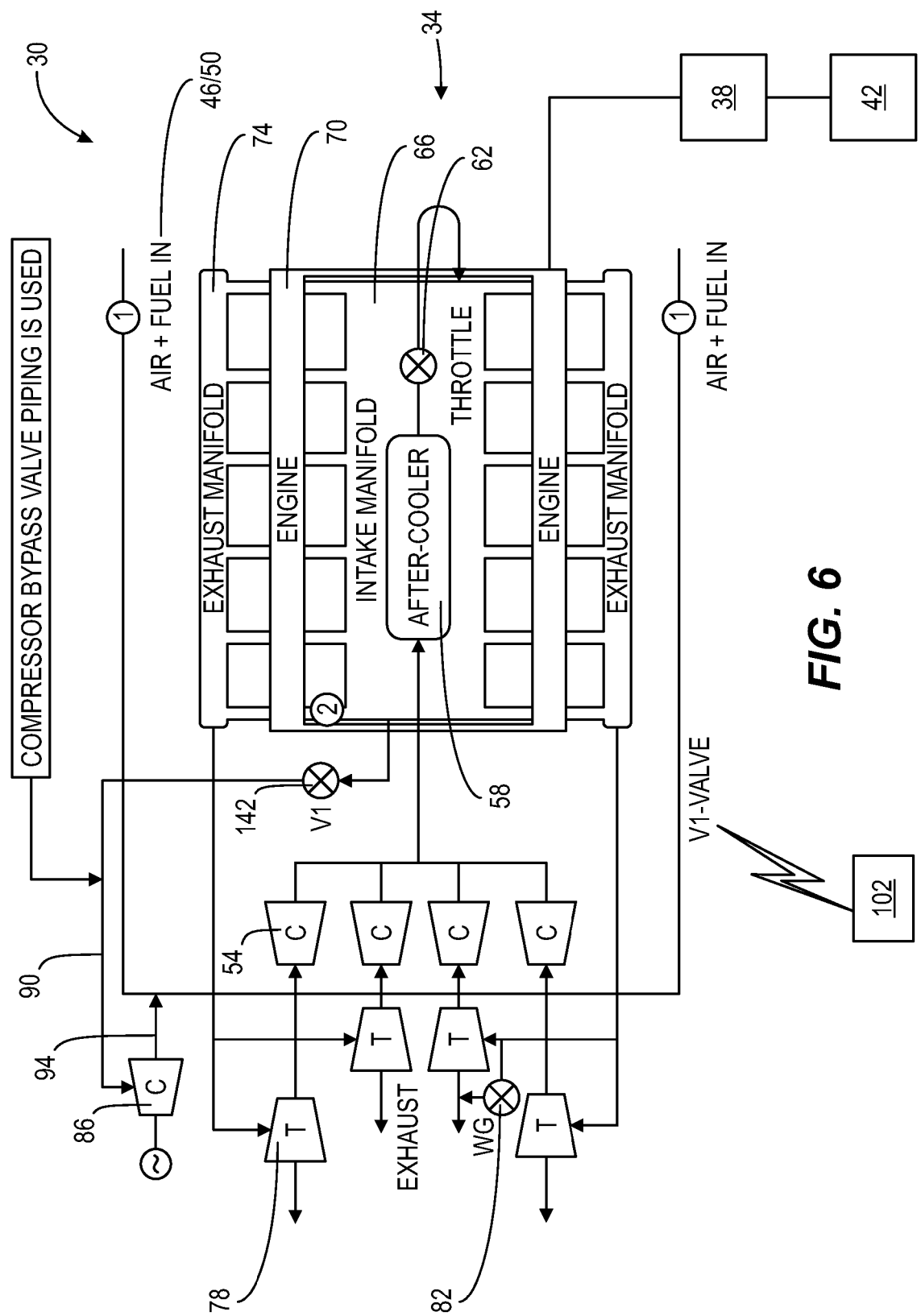
FIG. 6 is a schematic diagram of a generator set according to some embodiments.

As shown in FIG. 6, the bypass system of the engine 34 is altered so that the bypass valve 98 is eliminated and a bypass valve 142 is installed in the bypass intake 90 between the electronic compressor 86 and the intake manifold 66. The bypass valve 142 is positioned to isolate the electronic compressor 86 from the intake manifold 66.

In general, during a starting operation, a start signal is received from a user interface or the controller 102 and subsequently, the valve circuit 130 sends a valve open signal to the bypass valve 98 or 142 via the communication interface 138 and the bypass valve 142 or 98 is opened to provide communication between the intake manifold 66, the electronic compressor 86, and the bypass outlet 94. After the valve open signal is sent, the compressor circuit 126 sends a compressor on signal to the electronic compressor 86 via the communications interface 138 to activate the electronic compressor 86 and provide a suction at the intake manifold 66. After the compressor on signal is sent, the starter circuit 122 sends a cranking start signal via the communications interface 138 to the starter motor 124 to activate the starter motor 124 and crank the engine 34. The activation of the electronic compressor 86 as an E-pump sucks the fresh air out of the intake manifold 66 and increases the speed with which air/fuel mixture enters the cylinders 70. This increase in speed of the charge reaching the cylinders 70, reduces the fuel transport delay time and therefore reduces the time it takes the engine 34 to start and pick up speed to a desired operating speed.

Figure 7:
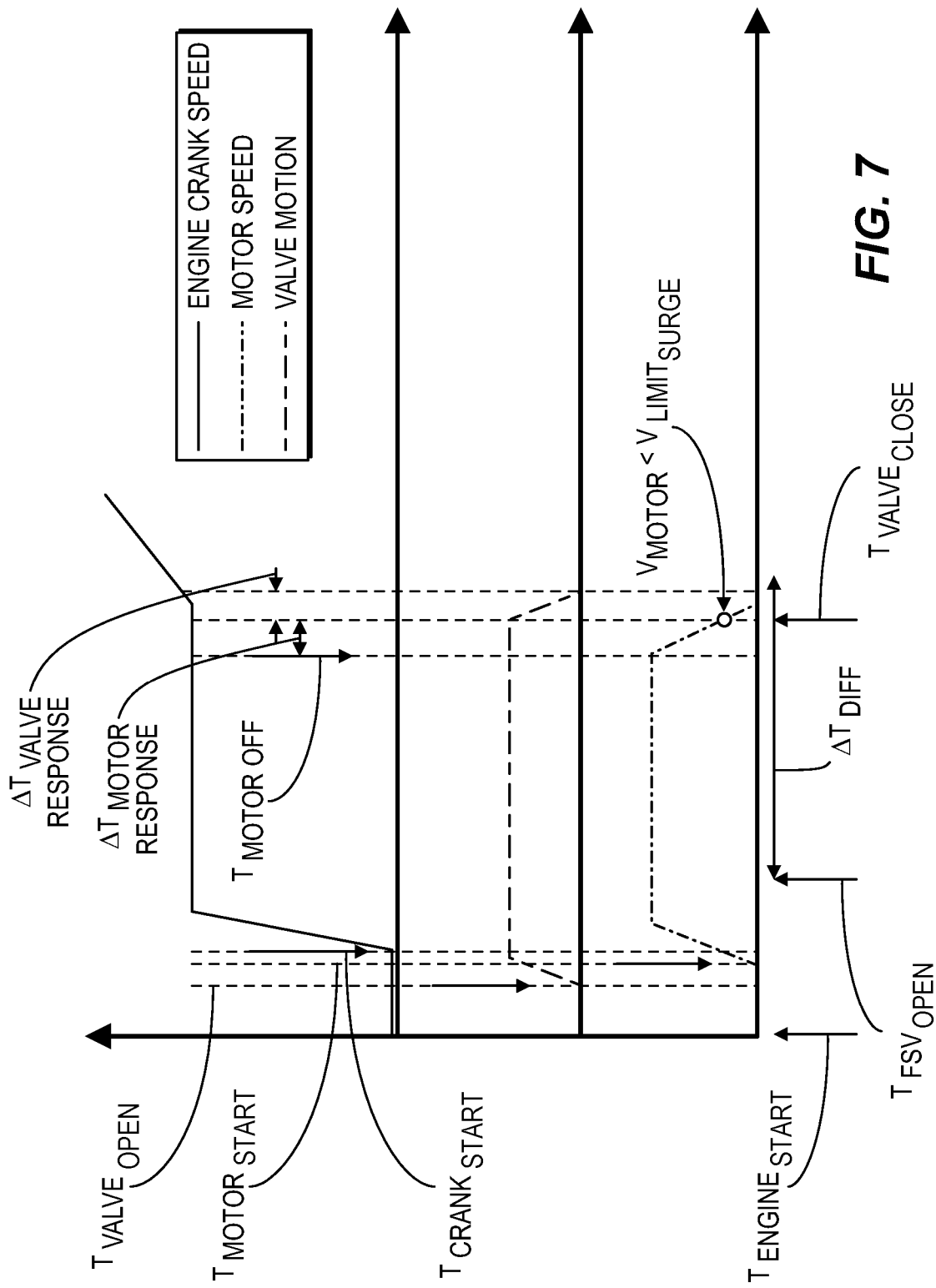
FIG. 7 is a graph showing engine crank speed, electronic compressor speed, and valve position of the generator set of FIG. 4 over time, according to some embodiments.

As shown in FIG. 7, the engine start signal is received is received a $t_{engine_{start}}$ and the valve open signal is sent at $t_{valve_{open}}$. After the valve open signal is sent, the compressor on signal is sent at $t_{motor_{start}}$. After the compressor on signal is sent, the cranking start signal is sent at $t_{crank_{start}}$. With the bypass valve 98 or 142 open, the electronic compressor 86 running as an E-pump, and the starter motor 124 cranking, the air/fuel circuit 134 commands the air handling system 46 and the fuel handling system 50 (e.g., a fuel selector valve, FSV) to introduce fuel into the charge at $t_{FSV_{open}}$. In some embodiments, $t_{motor_{start}} = t_{crank_{start}}$ where $t_{crank_{start}}$ is defined by the time when $v_{engine} > v_{crank_{min}}$.

After a purge time, the compressor circuit 126 sends a compressor off signal at $t_{motor_{off}}$, the valve circuit 130 sends a valve close signal at $t_{valve_{close}}$, and starter circuit 122 discontinues operation of the starter motor 124 when engine speed picks up.

The transition time for the bypass valve 98 or 142 from open to close (similar duration reversely) is $\Delta t_{valve_{response}}$. Similarly, that for motor of the electronic compressor 86 is $\Delta t_{motor_{response}}$. The time for fuel to reach the bypass system is a purge time $\Delta t_{diff}$. In some embodiments, $\Delta t_{diff}$ is determined experimentally. In some embodiments, $\Delta t_{diff}$ is determined by a model and verified experimentally. The value of $\Delta t_{diff}$ is dependent of the plumbing and routing of conduits within the engine 34 and on the specific configuration of the engine 34. The control of the engine 34 should meet the requirement below:

$$\Delta t_{diff} + t_{FSV_{open}} > t_{valve_{close}} + \Delta t_{valve_{response}}$$

This requirement reduces the likelihood of fuel entering the E-pump loop (i.e., the bypass system).

Valve closing timing is preferably after the time when the speed of the electronic compressor 86 is below a threshold speed at which output pressure could be detrimental to the system in the bypass valve 98 or 142 were closed, $v_{motor} < v_{limit_{surge}}$. Additionally, the bypass valve 98 or 142 is closed while the pressure in the bypass intake 90 is above a backflow pressure threshold in order to inhibit backflow from the electronic compressor 86 to the intake manifold 66.

$\Delta t_{diff}$ can be affected by density and viscosity of the air within the E-pump loop, altitude of operation, fuel composition, and operating temperature. $\Delta t_{motor_{response}}$, $\Delta t_{valve_{response}}$ can be affected by the state of a battery powering the electric motor 86 and the bypass valve 98 or 142. For instance, the supplied power may be affected by state of charge and age of the battery pack. Drag coefficient of the flow in the intake manifold 66, altitude of operation, fuel composition, and operating temperature can also affect $\Delta t_{motor_{response}}$, $\Delta t_{valve_{response}}$ The backflow pressure threshold can be affected by gas condition, altitude of operation, fuel composition, and operating temperature.

In some embodiments, the control methodology is time based. The starter motor 124 and the electronic compressor 86 start together and the electronic compressor 86 is shut off after a predetermined time. The time to shut off the electronic compressor 86 depends on the time for the fuel to arrive to the intake manifold 66. This time depends on the engine 34 flow and the electronic compressor 86 flow. One exemplary approach is to estimate the time as a combination of the number of engine cycles (engine flow) and time (the electronic compressor 86 flow). Another exemplary approach includes replacing the time-based methodology with a model of the electronic compressor 86 flow as a function of the compressor motor speed and boundary pressures.

The controller 102 is structured to receive information from the engine and peripheral systems. For example, the controller 102 may utilize a time of starter engagement or control command, a time of the electronic compressor 86 start or command, an engine speed, an intake manifold pressure and temperature, a cam phaser position, an exhaust pressure, a compressor motor speed, a compressor inlet pressure, a time of fueling start, and other information.

The controller 102 is structured to inhibit the electronic compressor 86 from exceeding a desirable speed because of the change of fluid resistance when bypass valve 98 or 142 closes. The controller 102 also controls operation of the bypass system to inhibit fuel from entering the bypass system to avoid intake manifold over pressure (IMOP) or not having impact on current air fuel ratio control. The controller 102 minimizes the delay due to the fuel selector valve opening time and provides a backup sequence if the engine 34 is not started for the first time.

Figure 8:
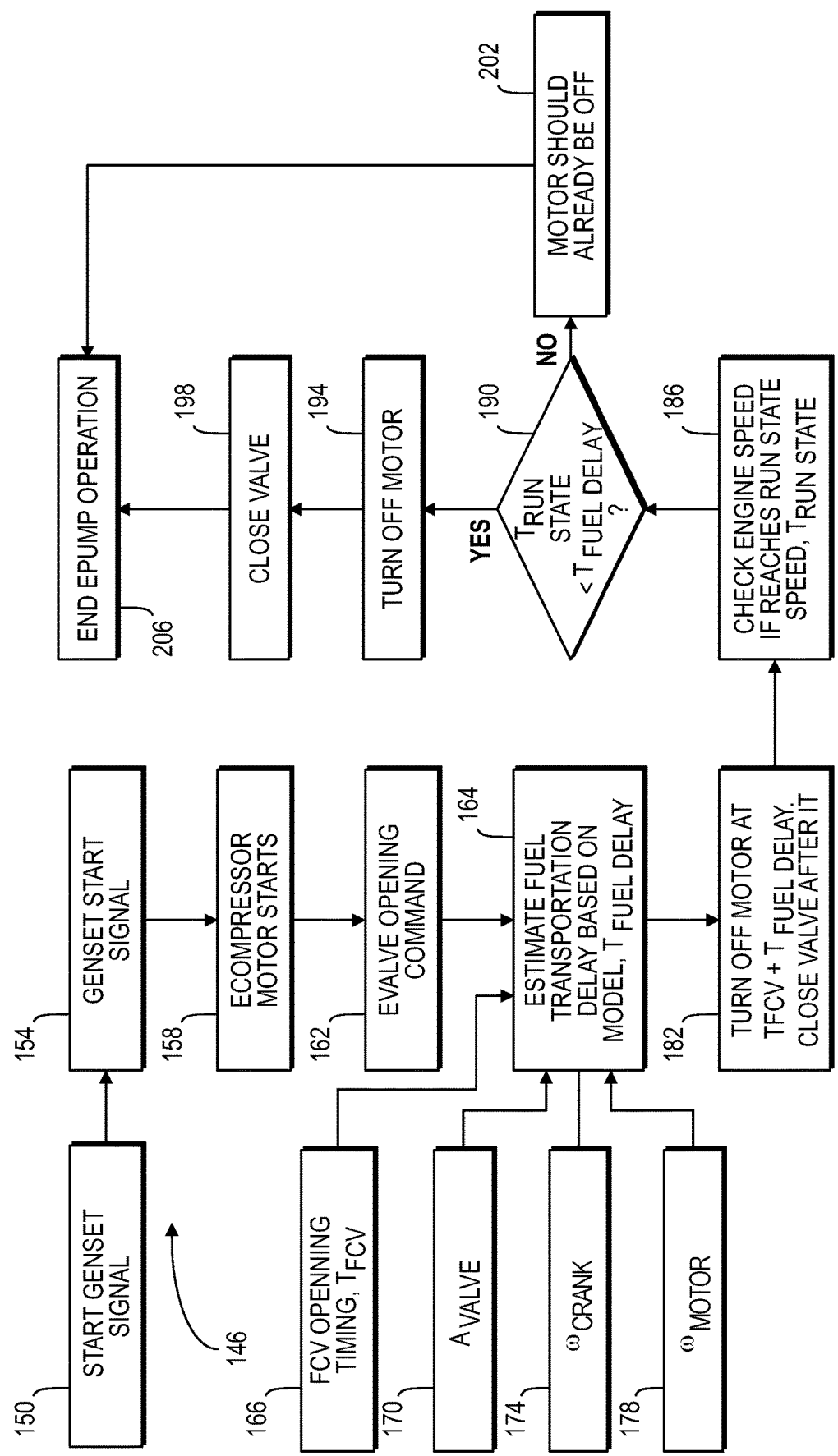
FIG. 8 is a flow diagram showing a method of operating the generator set of FIG. 4 according to some embodiments.

As shown in FIG. 8, a method 146 includes sending the engine start signal at step 150 and initializing the controller 102 at $t_{engine_{start}}$ in step 154. The electronic compressor 86 is started in step 158 and the bypass valve 98 or 142 is opened at step 162. In some embodiments, the electronic compressor 86 is started after the bypass valve 98 or 142 is opened. At step 164, the fuel transport delay is determined based on the fuel handling system at step 166, the air handling system at step 170, the angular velocity of the engine 34 at step 174, and the angular velocity of the electronic compressor 86 at step 178. At step 182, the electronic compressor 86 is deactivated at $t_{motor_{off}}$ and bypass valve 98 or 142 is closed at $t_{valve_{close}}$. In some embodiments, the electronic compressor 86 is deactivated and the bypass valve 98 or 142 is closed at a time equal to $t_{FCV}+t_{Fuel\ delay}$. At step 186, the controller 102 checks the engine speed and records a counter $t_{run\ state}$ when the engine speed is at a run speed. At step 190, the controller compares the counter $t_{run\ state}$ to $t_{Fuel\ delay}$. If the counter $t_{run\ state}$ is less than the $t_{Fuel\ delay}$, then E-pump loop operates until $t_{run\ state}$ equals the $t_{Fuel\ delay}$ and the electronic compressor 86 is deactivated at step 194 and the bypass valve 98 or 142 is closed at step 198. If the $t_{run\ state}$ is greater than the $t_{Fuel\ delay}$, the electronic compressor 86 should already be off, as checked at step 202. At step 206, the starting operation ends and normal operation of the engine 34 begins.

Figure 9:
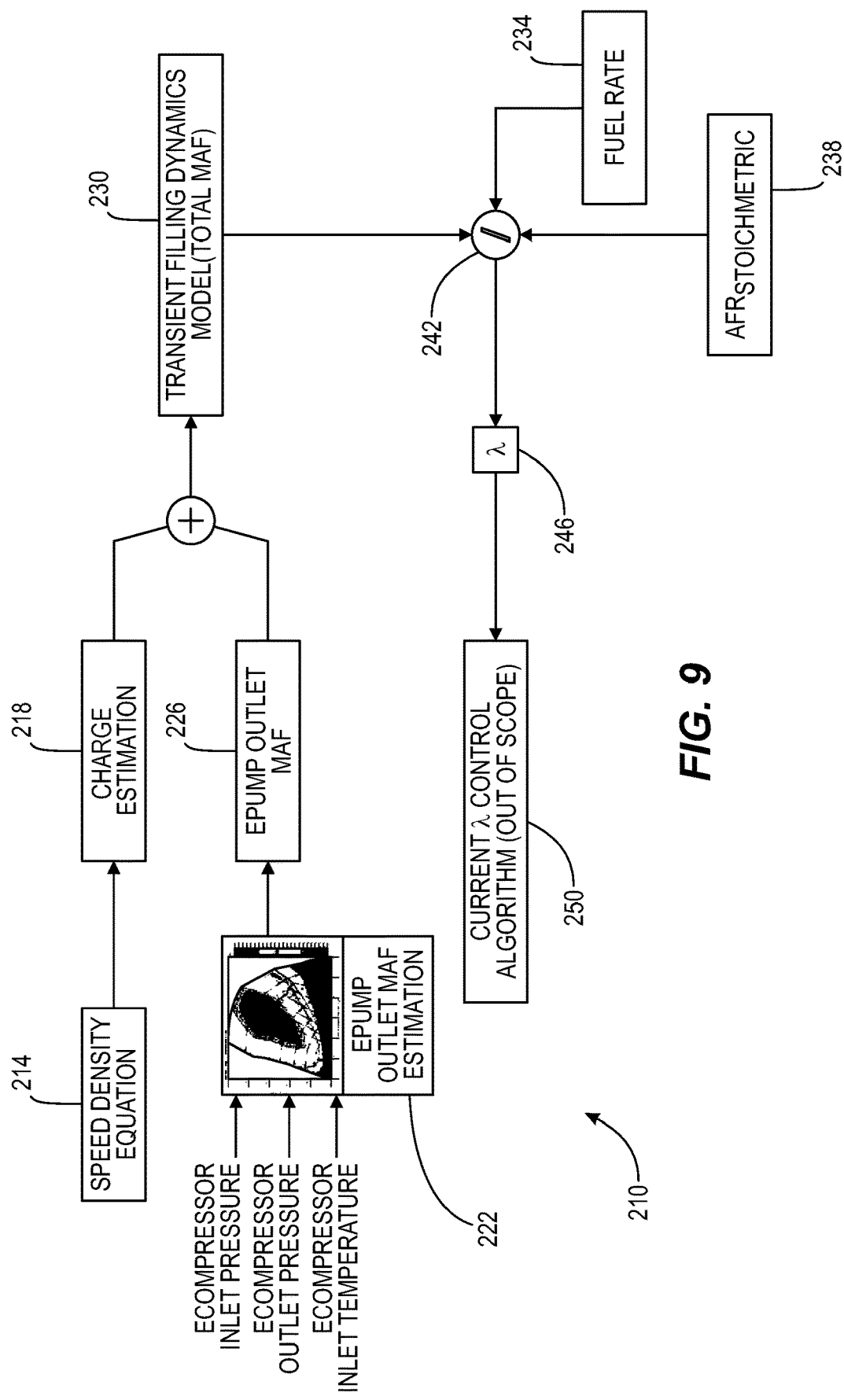
FIG. 9 is a flow diagram showing a method of operating the generator set of FIG. 4 according to some embodiments.

As shown in FIG. 9, lambda calculations for ideal engine 34 operation can be performed in view of the effects caused by operation of the bypass system. A method 210 starts with a speed density equation at step 214 that results in a desired charge estimation at step 218. At step 222, the controller 102 receives inputs relevant to a mass air flow (MAF) of the electronic compressor 86 and an outlet MAF is determined at step 226. The outlet MAF is the MAF present in the bypass outlet 94 when the electronic compressor 86 is running and the bypass valve 98 or 142 is open. The charge estimation and the outlet MAF are combined and a transient filling dynamics model is updated at step 230 and models the system dynamics including the effects of the electronic compressor 86 and the bypass system. Fueling rates at step 234, and stoichiometric air/fuel ratio data at step 238 and combined with the transient filling dynamics model at step 242 and a lambda calculation is executed at step 246. The controller 102 then uses the lambda calculation to determine a lambda control algorithm for the system at step 250.

Figure 10:
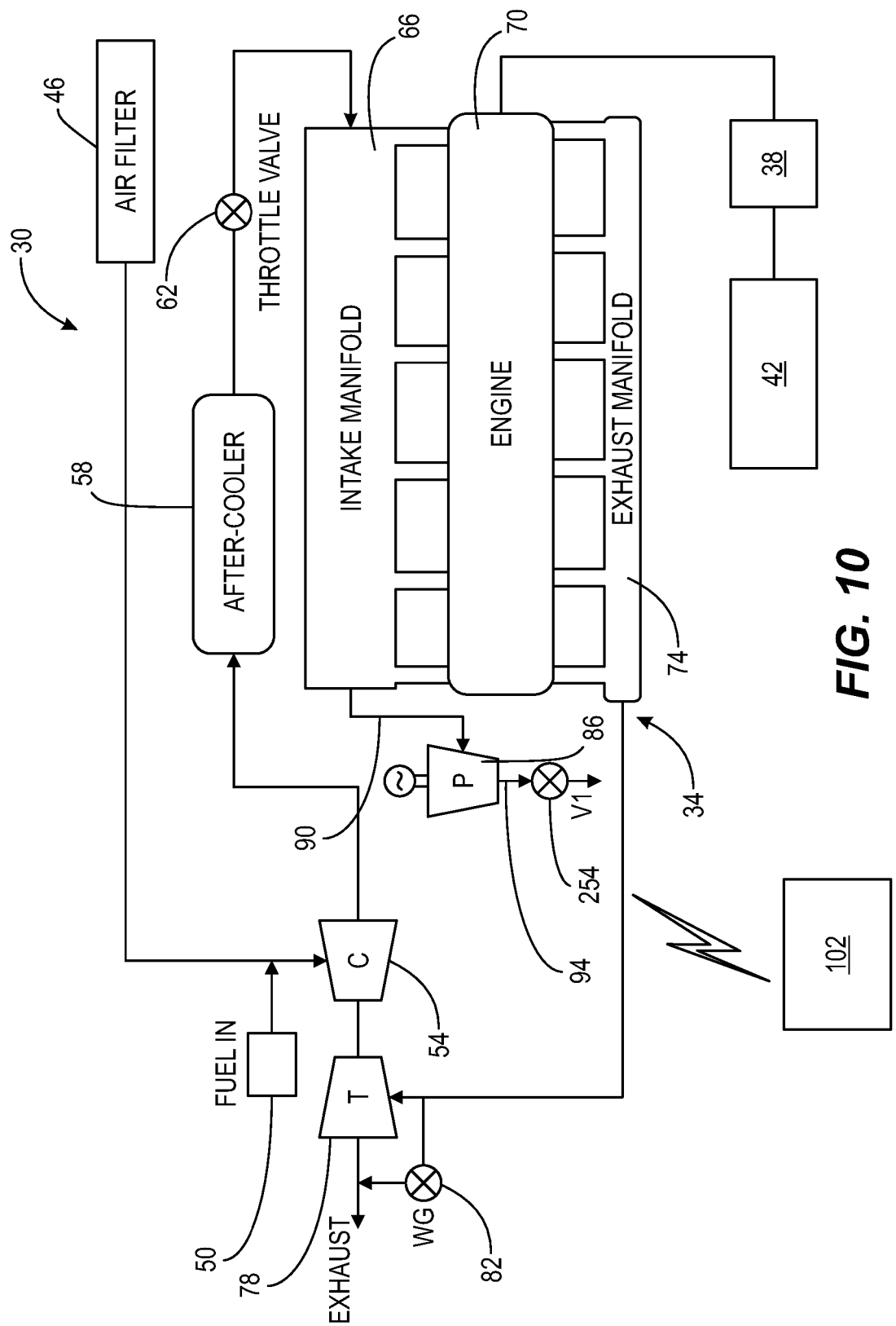
FIG. 10 is a schematic diagram of a generator set according to some embodiments.

As shown in FIG. 10, the bypass system can be configured to include the electronic compressor 86, a bypass intake 90 coupled between the electronic compressor 86 and the intake manifold 66, a bypass outlet 94 coupled between the electronic compressor 86 and the exhaust manifold 74, and a bypass valve 254 positioned in the bypass outlet 94 to selectively allow and inhibit flow therethrough. The use of the electronic compressor 86 as an E-pump creates suction at the far end of intake manifold 66 to reduce the fuel transportation delay time. Delivery to exhaust manifold 74 gives the benefit of assisting the main turbine 78 in the turbocharger.

In some embodiments, the electronic compressor 86 is immediately activated when the cranking command is given and operates until fuel reaches the farthest port (e.g., for 3.5 to 4 seconds). Once the engine starts generating mechanical power (speed pickup starts), the power to the electronic compressor 86 is cut off and the bypass valve 254 is closed to inhibit any cross flow. The suction due to the electronic compressor 86 increases the mass flow in the system effectively reducing the fuel transport delay time without the need to increase the engine cranking speed.

Figure 11:
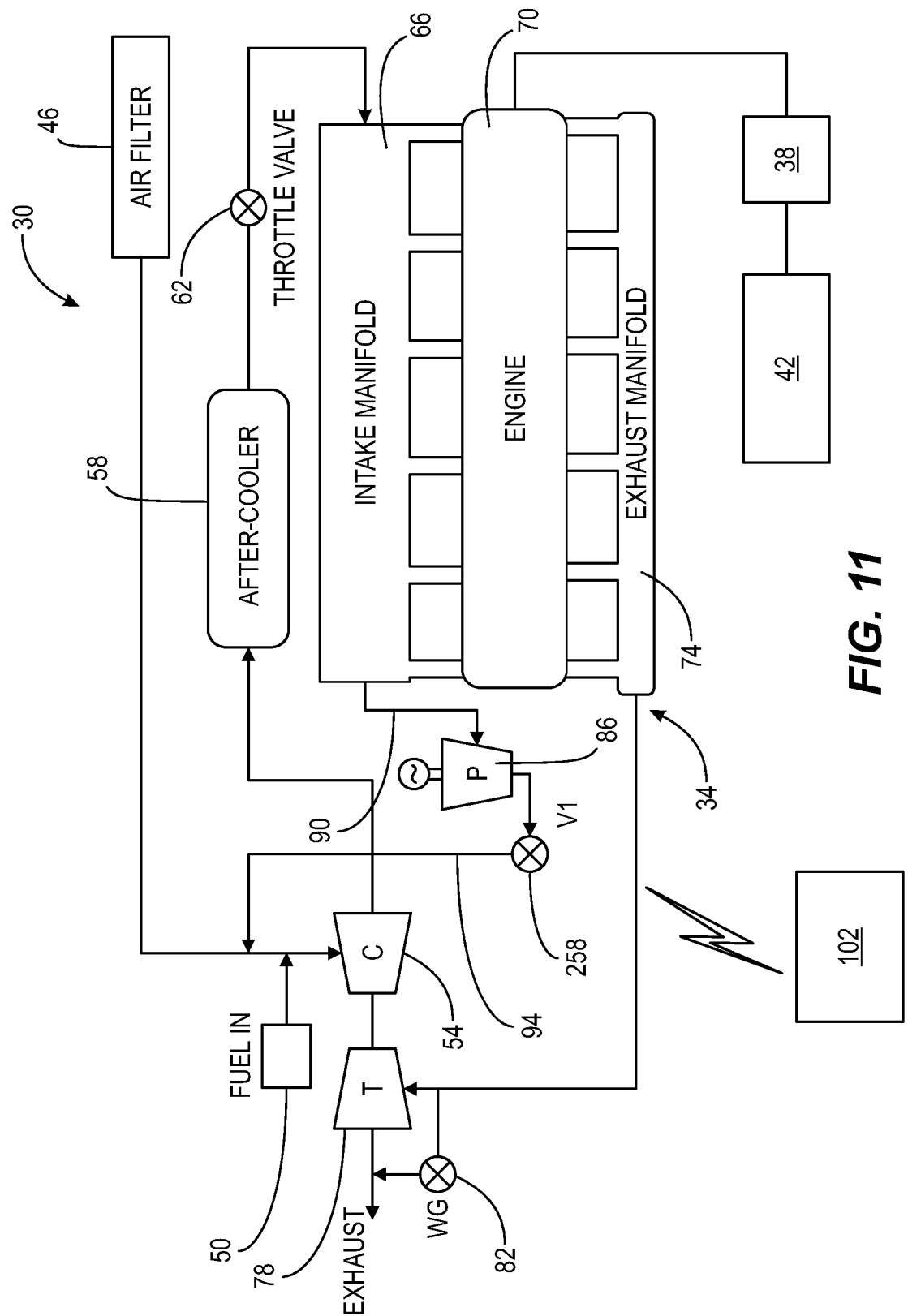
FIG. 11 is a schematic diagram of a generator set according to some embodiments.

As shown in FIG. 11, the bypass system can be configured to include the electronic compressor 86, a bypass intake 90 coupled between the electronic compressor 86 and the outlet of the after-cooler 58 upstream of the throttle valve 62, a bypass outlet 94 coupled between the electronic compressor 86 and the intake of the compressor 54 upstream of an injection point of the fuel handling system 50, and a bypass valve 258 positioned in the bypass outlet 94 to selectively allow and inhibit flow therethrough.

Figure 12:
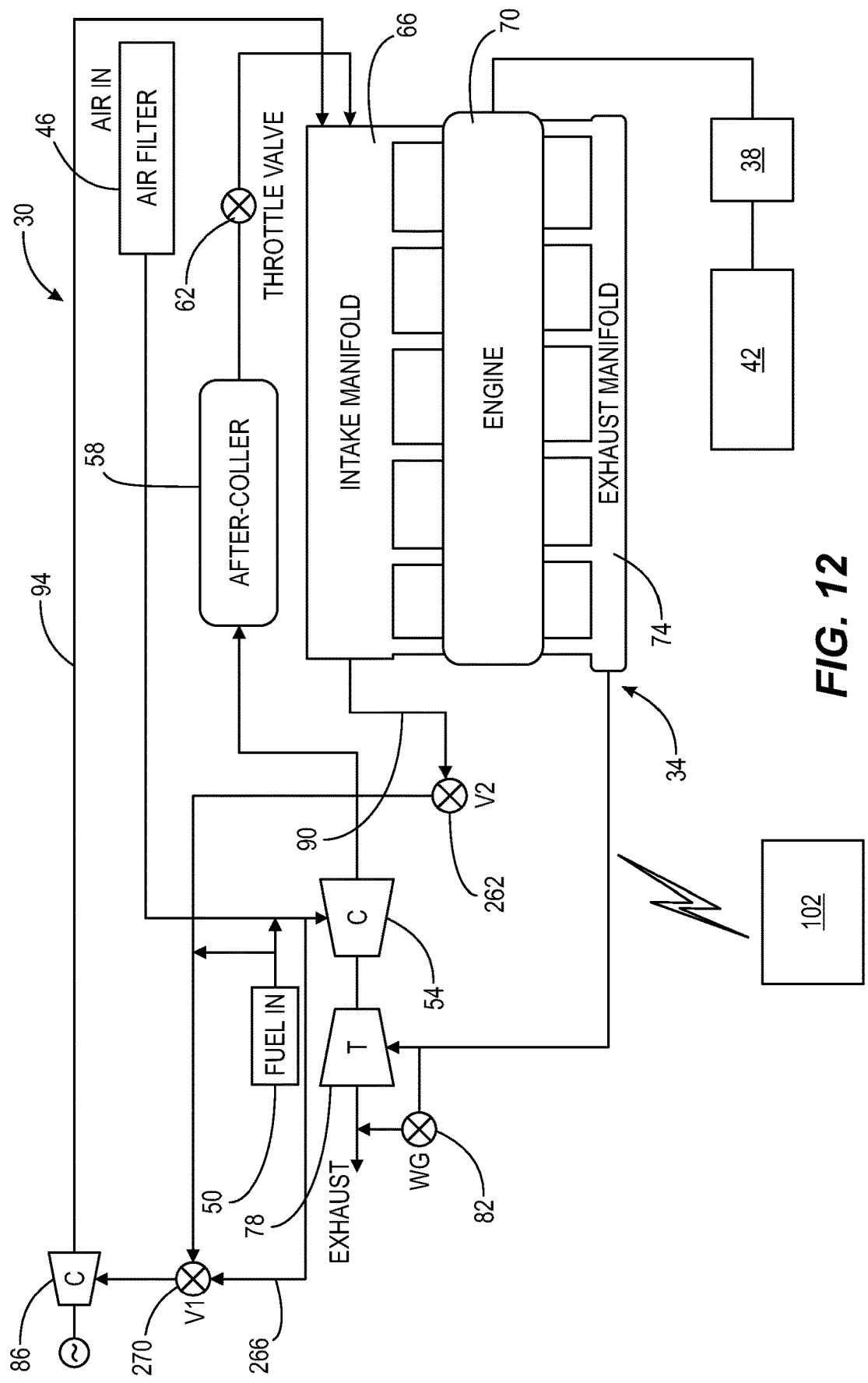
FIG. 12 is a schematic diagram of a generator set according to some embodiments.

As shown in FIG. 12, the bypass system can be configured to include the electronic compressor 86, a bypass outlet 94 coupled between the electronic compressor 86 and the exhaust manifold 74, a first bypass intake 266 coupled between the intake of the compressor 54 downstream of the fuel injection point and the electronic compressor 86, a first bypass valve 270 positioned in the second bypass intake 266 to selectively allow and inhibit flow therethrough, a second bypass intake 90 coupled between the electronic compressor 86 and the intake manifold 66, and a second bypass valve 262 positioned in the bypass intake 90 upstream of a fuel injection point to selectively allow and inhibit flow therethrough. This arrangement allows the bypass system to operate as both an E-pump and an E-compressor.

Figure 13:
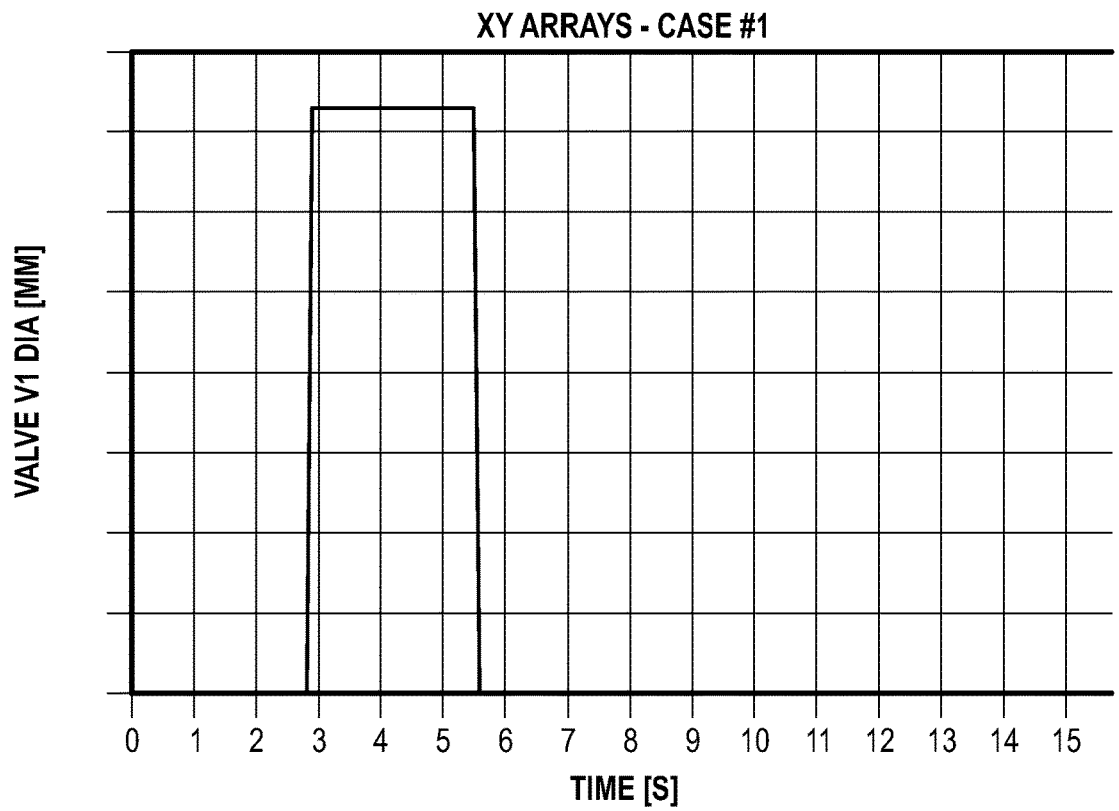
FIG. 13 is a graph showing a position of a first bypass valve of the generator set of FIG. 12 according to some embodiments.
Figure 14:
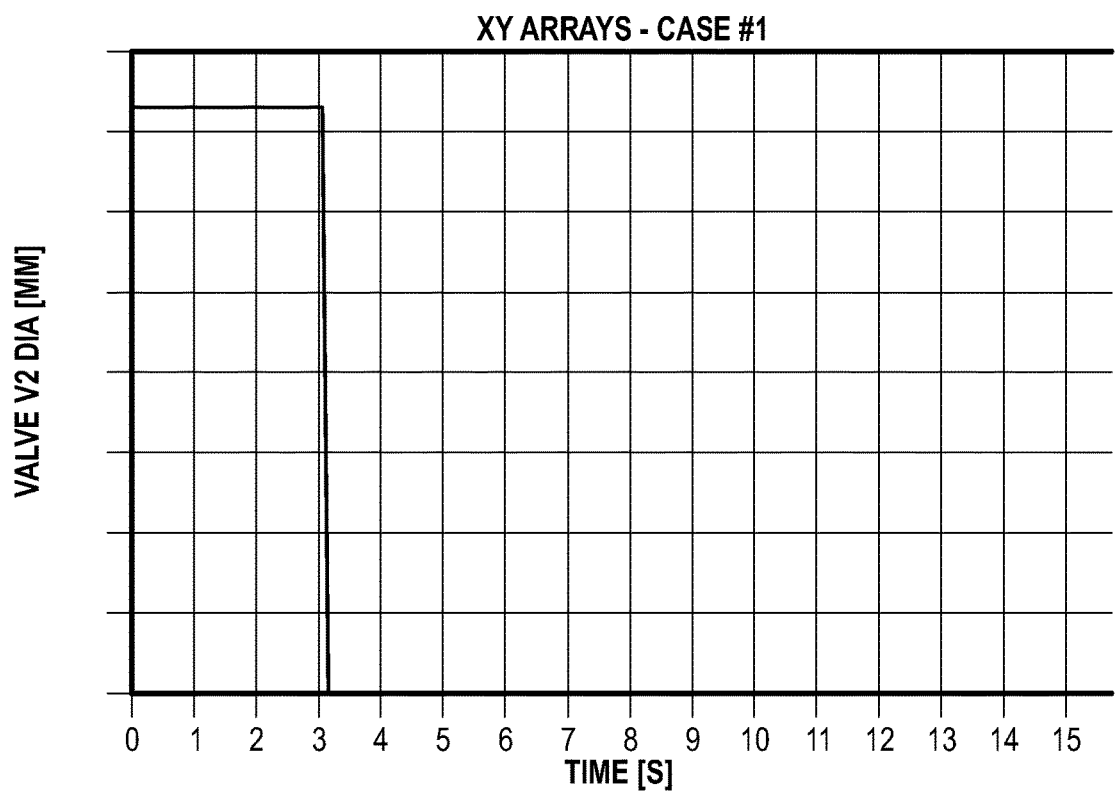
FIG. 14 is a graph showing a position of a second bypass valve of the generator set of FIG. 12 according to some embodiments.
Figure 15:
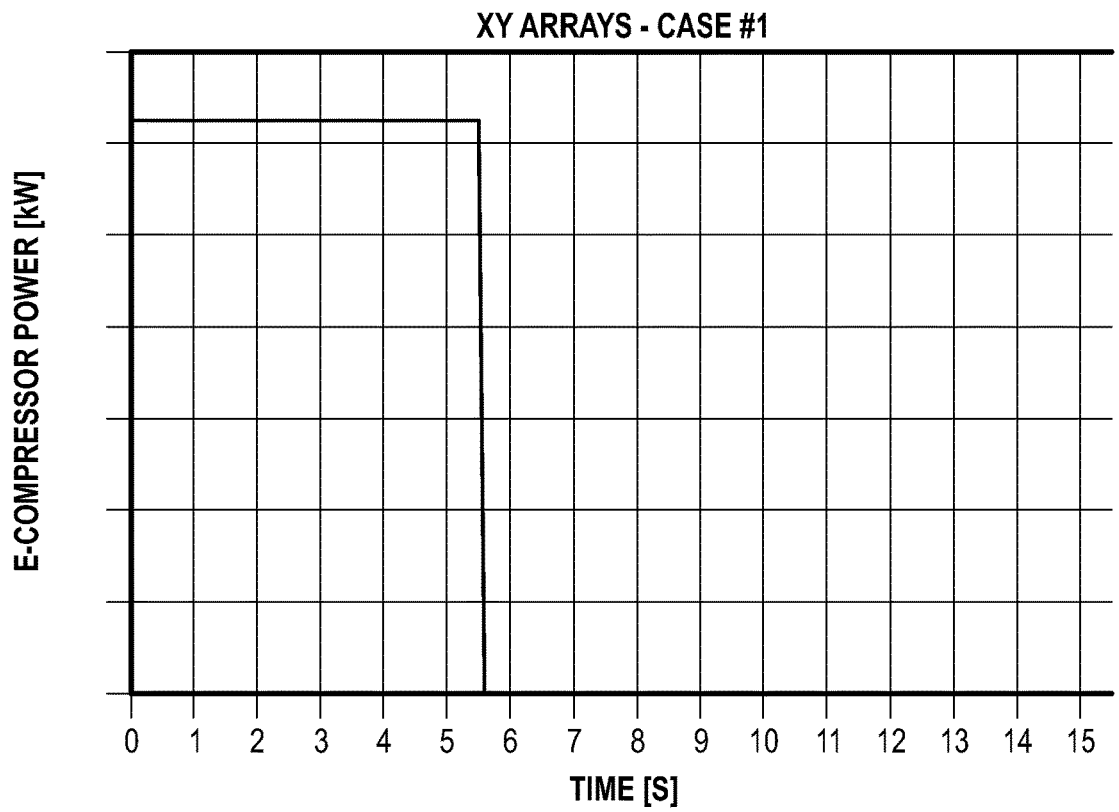
FIG. 15 is a graph showing a power provided to an electronic compressor of the generator set of FIG. 12 according to some embodiments.

In one exemplary method of operation, as shown in FIG. 13, the first bypass valve 270 is initially closed and opens at 2.9 seconds until 5.5 seconds. In other words, the first bypass valve 270 is open for 2.6 seconds. As shown in FIG. 14, the second bypass valve 262 is open for 3 seconds and then closes. As shown in FIG. 15, the electronic compressor 86 is fully powered for 5.5 seconds. The method shown in FIGS. 13-15 can provide beneficial response during load pickup by utilizing the first bypass intake 266 and the first bypass valve 270 after the fresh air is purged from the intake manifold 66.

Figure 16:
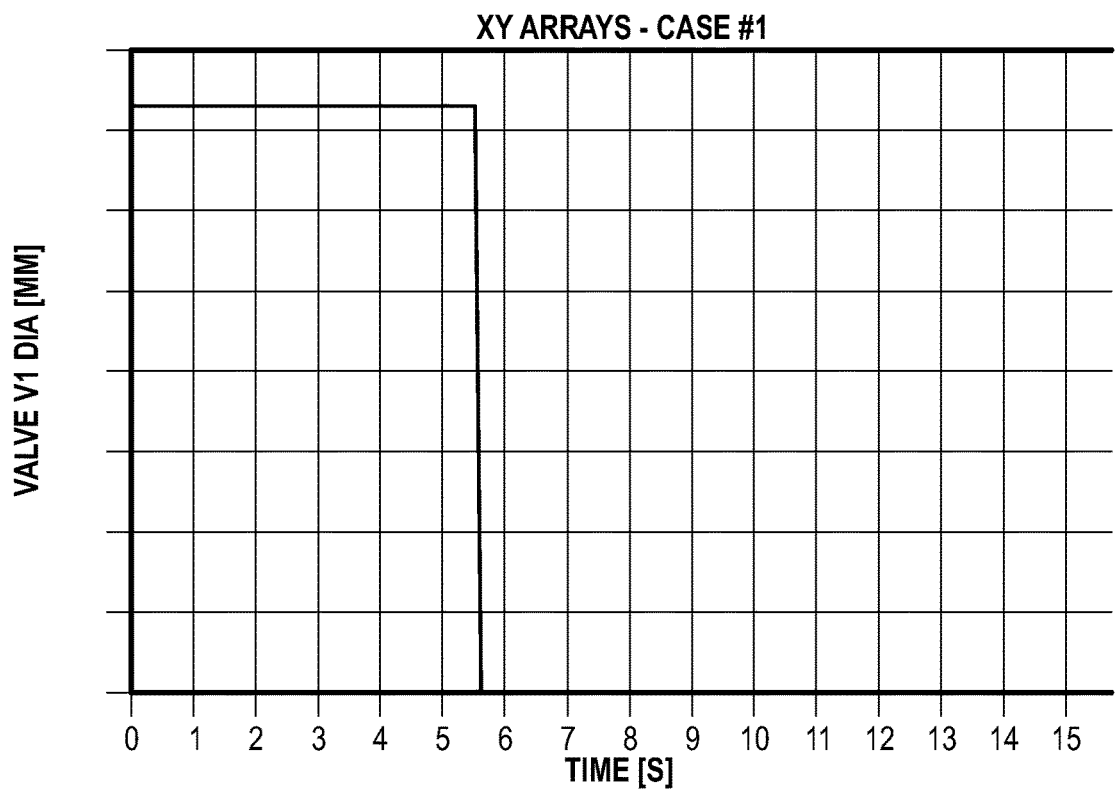
FIG. 16 is a graph showing a position of a first bypass valve of the generator set of FIG. 12 according to some embodiments.
Figure 17:
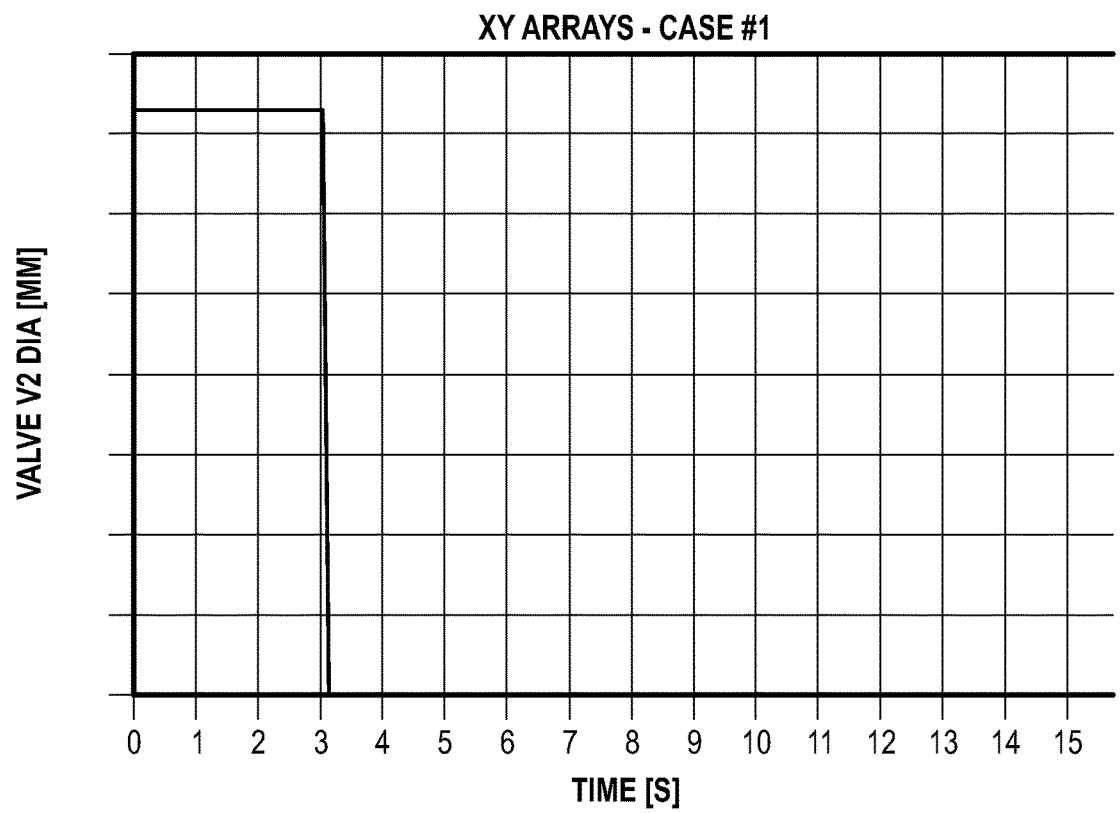
FIG. 17 is a graph showing a position of a second bypass valve of the generator set of FIG. 12 according to some embodiments.
Figure 18:
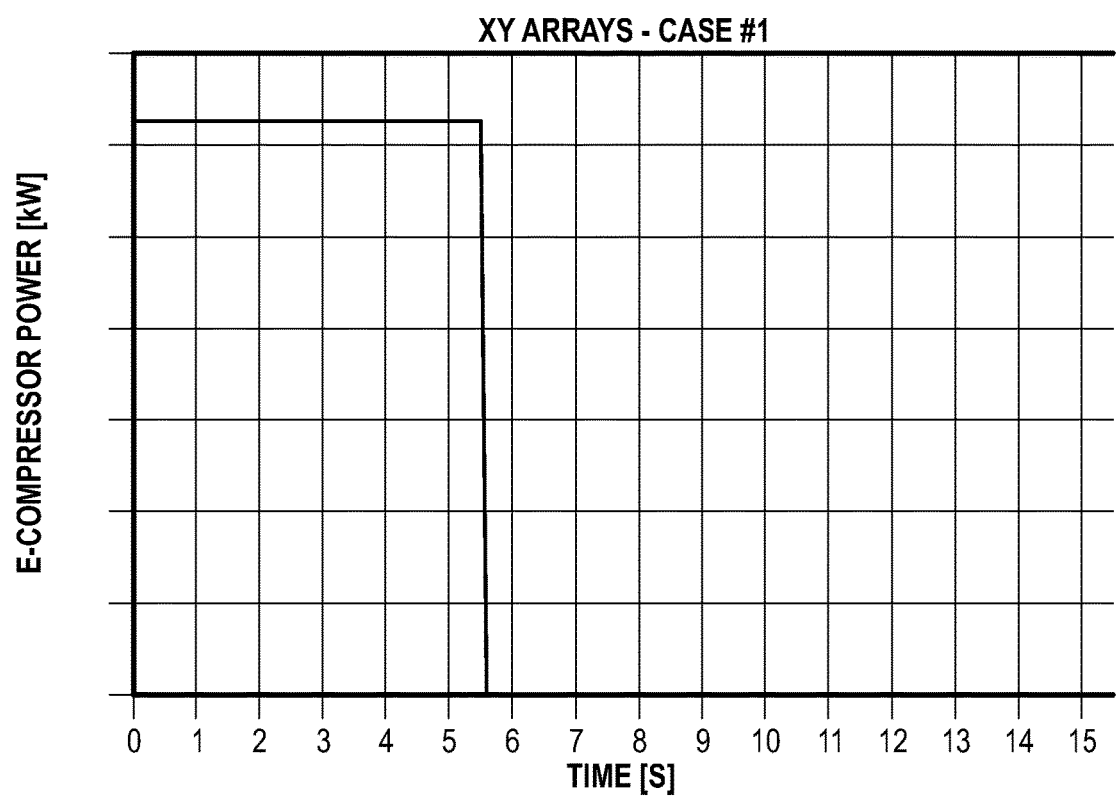
FIG. 18 is a graph showing a power provided to an electronic compressor of the generator set of FIG. 12 according to some embodiments.

In another exemplary method of operation, as shown in FIG. 16, the first bypass valve 270 is open for 5.5 seconds and then closes. As shown in FIG. 17, the second bypass valve 262 is open for 3 seconds and then closes. As shown in FIG. 18, the electronic compressor 86 is fully powered for 5.5 seconds. The method shown in FIGS. 16-18 can provide beneficial response during speed pickup by utilizing the first bypass intake 266 and the first bypass valve 270 concurrently with the second bypass intake 90 and the second bypass valve 262.

Figure 19:
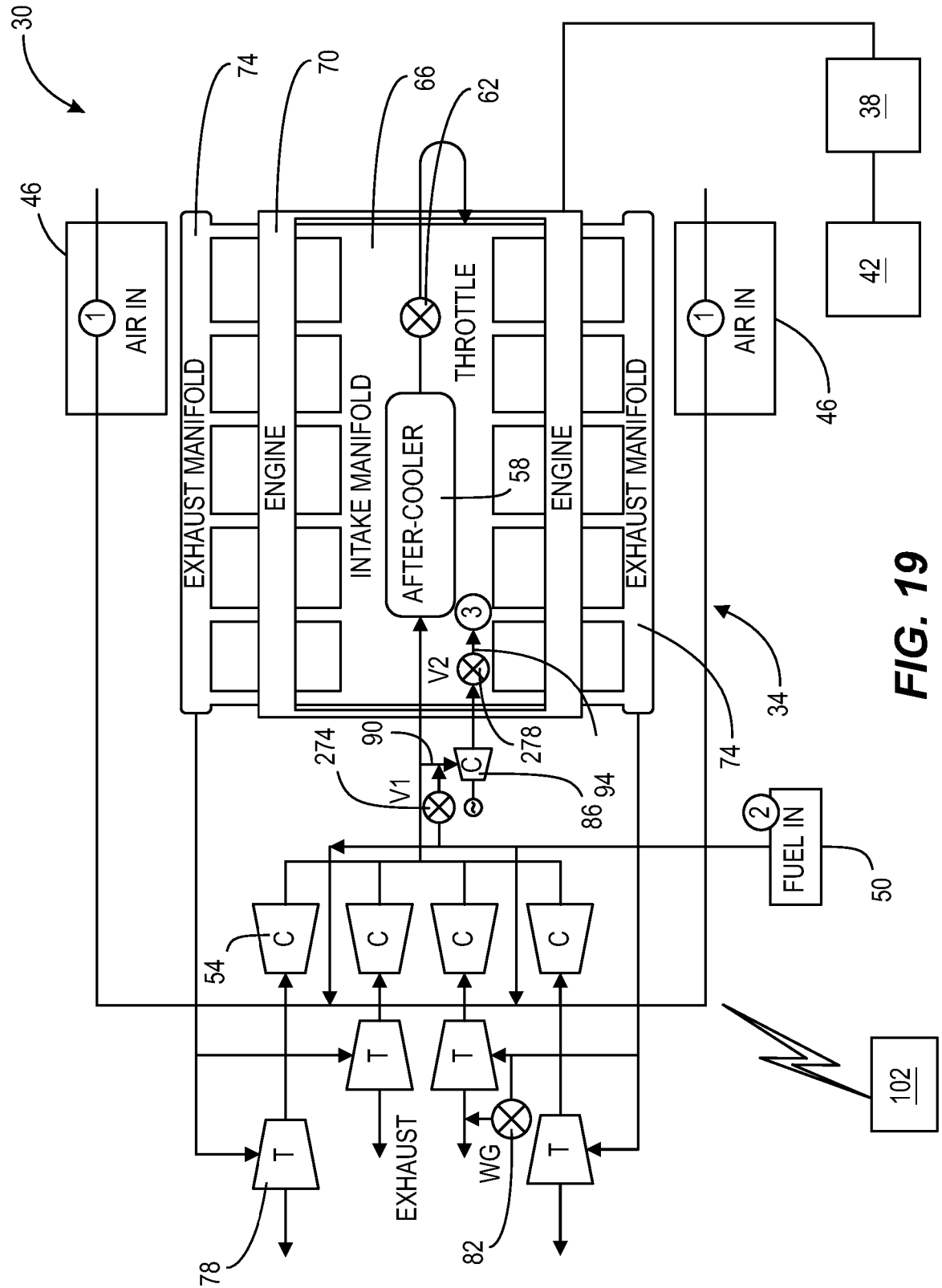
FIG. 19 is a schematic diagram of a generator set according to some embodiments.

As shown in FIG. 19, the bypass system can be configured as an E-compressor including an electronic compressor 86, a bypass intake 90 coupled between the an inlet of the after-cooler 58 and the electronic compressor 86, a fuel injection valve 274 positioned to inject fuel into the bypass intake 90, a bypass outlet 94 coupling the electronic compressor 86 to the intake manifold 66, and a bypass valve 278 positioned in the bypass outlet 94 to selectively allow and inhibit flow therethrough. Operation of the electronic compressor 86 as an E-compressor helps ramp the speed of the turbochargers. The charge produced by the compressors 54 is mixed with fuel from valve 274 and the mixed charge is injected at the end of the intake manifold allowing the front cylinders 70 to fire sooner. Any leakage through the bypass system will flow back to the compressor 54 inlets. In some embodiments, the mixed charge is injected near cylinder two in a bank of cylinders 70. In some embodiments, fuel is mixed in the electronic compressor 86 piping using an injector object which targets a lambda of 1 from 0 to 3.5 seconds and then is made 1000 to simulate no fueling. In some embodiments, the generator set 30 shown in FIG. 19 has achieved a reduction in the speed pickup time of about 48.2 percent.

The disclosure presents a novel approach to control for an electronic compressor loop type configuration. The loop uses a compressor to accelerate the circulation of air in the intake manifold at the beginning of the engine operation to move the fuel air mixture to the intake manifold faster. The control strategy proposes a solution of how to control the motor of the electric compressor, how to estimate fuel transportation delay to control the electronic compressor loop and how the lambda control is adjusted based on the added flow from electronic compressor. During operation, the throttle of the engine is wide open and there is negligible pressure drop in the intake manifold.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 5, it should be understood that the controller 102 may include any number of circuits for completing the functions described herein. For example, the activities and functionalities of the starter circuit 122, the compressor circuit 126, the valve circuit 130, and the air/fuel circuit 134 may be combined in multiple circuits or as a single circuit. Additional circuits with additional functionality may also be included. Further, the controller 102 may further control other activity beyond the scope of the present disclosure.

As mentioned above and in one configuration, the "circuits" may be implemented in machine-readable medium for execution by various types of processors, such as the processor 110 of FIG. 5. An identified circuit of executable code may, for instance, comprise one or more physical or logical blocks of computer instructions, which may, for instance, be organized as an object, procedure, or function. Nevertheless, the executables of an identified circuit need not be physically located together but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits and may be embodied in any suitable form and organized within any suitable type of data structure. The operational data may be collected as a single data set or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the generator sets 30 as shown in the various exemplary embodiments is illustrative only. Additionally, any element disclosed in one embodiment may be incorporated or utilized with any other embodiment disclosed herein. For example, aspects of the various bypass systems of the exemplary embodiments may be combined. It should be appreciated that other elements of the various embodiments may be incorporated or utilized with any of the other embodiments disclosed herein.

What is claimed is:

1. A system, comprising:
   an electronic compressor;
   a fuel handling system including a fuel injection point positioned upstream of an intake manifold;
   a bypass intake coupled between the intake manifold of an engine system of a generator set and the electronic compressor so that the electronic compressor provides suction at the intake manifold when activated so as to purge air out of the intake manifold with a mixed charge;
   a bypass outlet coupled between the electronic compressor and the engine system; and
   a valve positioned to selectively inhibit flow between the bypass intake and the bypass outlet during a starting operation.

2. The system of claim 1, wherein the bypass outlet is coupled between the electronic compressor and an intake of a turbocharger compressor.

3. The system of claim 2, wherein the fuel injection point is positioned between the bypass outlet and the turbocharger compressor.

4. The system of claim 1, wherein the valve is positioned in the bypass outlet.

5. The system of claim 1, wherein the bypass intake is coupled between an outlet of an after-cooler and the electronic compressor.

6. The system of claim 1, wherein the bypass outlet is coupled between the electronic compressor and the intake manifold of the engine system.

7. The system of claim 1, further comprising a circuit structured to:
   receive an engine start command,
   send a valve open signal to the valve after receiving the engine start command, send an electronic compressor start signal to the electronic compressor after receiving the engine start command,
   send a starter motor crank signal to a starter motor of the engine system after receiving the engine start command, and
   send an electronic compressor stop signal to the electronic compressor after a predetermined amount of time, and send a valve close signal to the valve at the same time or after the electronic compressor stop signal is sent.

8. The system of claim 7, wherein the predetermined amount of time is calibrated to equal the amount of time required to purge fresh air from the engine system.

9. A system comprising:
   an electronic compressor;
   a bypass intake coupled between an intake manifold of an engine system of a generator set and the electronic compressor so that the electronic compressor provides suction at the intake manifold when activated;
   a bypass outlet coupled between the electronic compressor and the engine system; and
   a valve positioned to selectively inhibit flow between the bypass intake and the bypass outlet during a starting operation, wherein the bypass outlet is coupled between the electronic compressor and an exhaust manifold of the engine system.

10. A system comprising:
    an electronic compressor;
    a bypass intake coupled between an intake manifold of an engine system of a generator set and the electronic compressor so that the electronic compressor provides suction at the intake manifold when activated;
    a bypass outlet coupled between the electronic compressor and the engine system; and
    a valve positioned to selectively inhibit flow between the bypass intake and the bypass outlet during a starting operation, wherein the bypass intake is coupled between an outlet of a turbocharger compressor and the intake manifold of the engine system.

11. The system of claim 10, wherein further comprising a fuel handling system structured to selectively inject fuel into the bypass intake.

12. A system of comprising:
    an electronic compressor;
    a bypass intake coupled between an intake manifold of an engine system of a generator set and the electronic compressor so that the electronic compressor provides suction at the intake manifold when activated;
    a bypass outlet coupled between the electronic compressor and the engine system;
    a valve positioned to selectively inhibit flow between the bypass intake and the bypass outlet during a starting operation;
    a second bypass intake coupled between an air handling system and the electronic compressor and structured to provide a mixed charge to the electronic compressor; and
    a second valve structured to selectively inhibit flow through the second bypass intake.

13. The system of claim 12, further comprising a circuit structured to:
receive an engine start command,
send a first valve open signal to the valve after receiving the engine start command,
send an electronic compressor start signal to the electronic compressor after receiving the engine start command,
send a starter motor crank signal to a starter motor of the engine system after receiving the engine start command, and
send a second valve open signal to the second valve after receiving the engine start command.

14. The system of claim 13, wherein the circuit is structured to send the second valve open signal after a purge time delay.

15. A method comprising:
opening a bypass valve providing communication between an engine system of a generator set and an electronic compressor;
starting the electronic compressor to provide suction at a bypass intake that is disposed between an intake manifold of the engine system and the electronic compressor so as to further provide suction at the intake manifold;
purging fresh air from the engine system with the started electronic compressor with a mixed charge;
cranking a starter motor after starting the electronic compressor;
stopping the electronic compressor after the fresh air has been partially or completely purged; and
closing the bypass valve after stopping the electronic compressor.

16. The method of claim 15, further comprising:
opening an E-compressor valve; and
providing the mixed charge via the E-compressor valve to the electronic compressor.

17. The method of claim 16, wherein the E-compressor valve is opened after a predetermined purge time.

18. The method of claim 15, wherein stopping the electronic compressor after the fresh air has been purged includes determining a purge time $\Delta t_{diff}$ that satisfies the following equation:

$$\Delta t_{diff} + t_{FSVopen} > t_{valve_{close}} + \Delta' valve_{response}$$

where $t_{FSVopen}$ is the time when fuel is introduced, $t_{valve_{close}}$ is the time when a bypass valve close signal is sent, and $\Delta' valve_{response}$ is the time it takes the bypass valve to close.

19. The method of claim 18, wherein the purge time $\Delta t_{diff}$ is determined experimentally.

* * * * *